(12) United States Patent
Tan

(10) Patent No.: US 7,726,565 B1
(45) Date of Patent: Jun. 1, 2010

(54) INSERTABLE AND REMOVABLE MAGNETIC STRIPE READER HEAD PROTECTION DEVICE

(76) Inventor: Ji Tan, 6883 Paul Mar Dr., Lantana, FL (US) 33462

( * ) Notice: Subject to any disclaimer, the term of this patent is extended or adjusted under 35 U.S.C. 154(b) by 478 days.

(21) Appl. No.: 11/835,482

(22) Filed: Aug. 8, 2007

(51) Int. Cl.
G06K 7/08 (2006.01)

(52) U.S. Cl. .................. 235/449; 360/128; 360/129; 360/137; 235/493; 235/439; 134/6

(58) Field of Classification Search ............... None
See application file for complete search history.

(56) References Cited

U.S. PATENT DOCUMENTS

| | | | |
|---|---|---|---|
| 6,210,490 B1 * | 4/2001 | Michael et al. ............. | 134/6 |
| 7,028,897 B2 * | 4/2006 | Fernandes et al. .......... | 235/449 |

FOREIGN PATENT DOCUMENTS

| | | | | |
|---|---|---|---|---|
| JP | 04330687 A | * | 11/1992 | |
| JP | 08227576 A | * | 9/1996 | |
| JP | 09269967 A | * | 10/1997 | |
| JP | 11031353 A | * | 2/1999 | |

* cited by examiner

Primary Examiner—Seung H Lee
Assistant Examiner—Christle I Marshall
(74) Attorney, Agent, or Firm—Gold & Rizvi, P.A.; H. John Rizvi; Glenn E. Gold

(57) ABSTRACT

An insertable and removable reader head protection device for a magnetic stripe reader is provided including a thin, non-ferromagnetic insertable panel that is disposed between the reader head and the magnetic stripe card, as the magnetic stripe card is inserted and swiped. The insertable and removable panel is adapted to protect the reader head from dirt, oil, and the like when inserted in the magnetic stripe reader and is adapted to be manually removable from this dirt-shielding position for manual cleaning. The reader head protection device provided includes embodiments both for use as an add-on accessory with existing types of magnetic stripe readers and for use during the initial manufacture of new magnetic stripe readers. When using the magnetic stripe reader head protection device the magnetic stripe reader owner will reduce downtime due to non-operational readers and reduce the cost of cleaning cards and service costs.

20 Claims, 8 Drawing Sheets

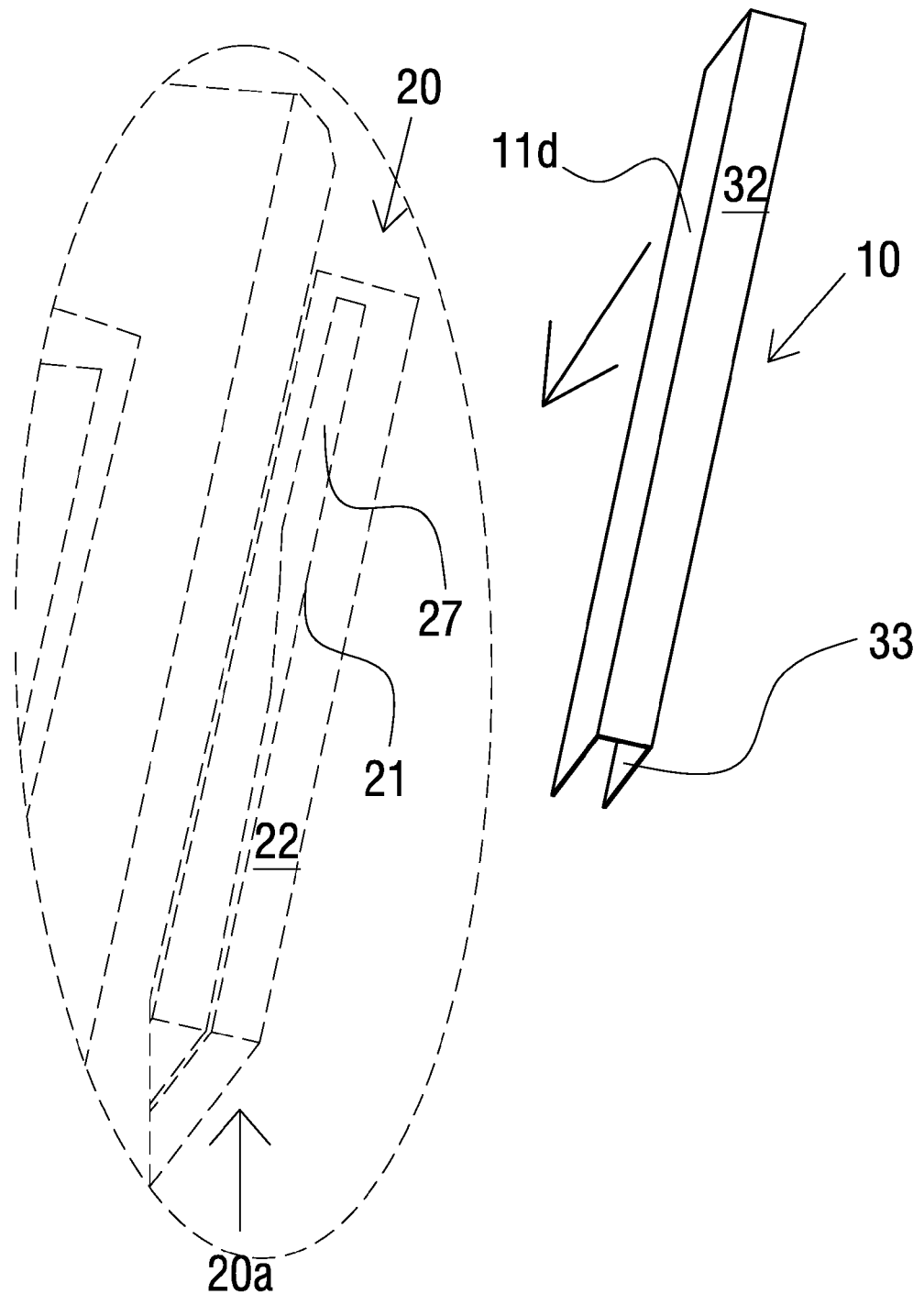

INSERTABLE AND REMOVABLE MAGNETIC STRIPE READER HEAD PROTECTION DEVICE

BACKGROUND OF THE INVENTION

1. Field of the Invention

The present invention relates generally to the field of electronic devices and equipment used in the processing of financial and security transactions using existing magnetic cards (such as credit cards, debit cards, gift cards, access cards, driver's licenses, etc.) having information recorded on a stripe recording medium and more particularly, to an insertable and removable reader head protection device for a magnetic stripe reader.

2. Description of the Prior Art

In twenty-first century America, the vast majority of businesses must accept credit and/or debit cards to accommodate the expectations of their paying customers and to remain competitive. While customers pay the same price for goods or services whether they use cash, credit or debit, certain types of payment represent additional costs to merchants. For example, it is well known that merchants must pay a processing fee each time that a credit card is used to make a purchase. Merchants also must acquire equipment to process credit or debit card purchases. Generally referred to as point of sale (POS) terminals, this equipment can perform a variety of functions depending on the needs of a particular business. All POS terminals, regardless of design and business-specific functions, must have a device with ferromagnetic material that can read the magnetic stripes on credit cards, debit cards, gift cards, access cards, driver's licenses, and other types of cards required for various types of transactions. This device, which may be external to the POS terminal or may be integrally attached to the POS terminal, is referred to as a magnetic stripe reader or MSR.

Although MSR's come in various designs, including swipe, insert, and motorized MSR's, they all function the same way. The MSR is configured with a small "head"—approximately ¼ of an inch—that reads the card's magnetic stripe. A magnetic stripe card has a magnetic stripe (magstripe) along one edge which contains coded data that is encoded into one or more of three tracks, each of which is used for different purposes, as specified by ANSI/ISO standards. The magstripe is positioned so that as it is moved across the MSR reader head the data coded into the magstripe is decoded by the MSR.

In the swipe-type MSR, the user fits the magnetic stripe card into a narrow card swipe track of the MSR and slides the card in a particular direction. The reader head is located on the side of the card swipe track and "reads" or decodes the data from one or more tracks of the card's magnetic stripe. Conventionally, on MSR's this reader head is enclosed within the card swipe track, which cannot be opened by the merchant who has purchased or rented the POS terminal and its corresponding MSR. The insert-type MSR functions in a similar manner, with the totality of the card being inserted into the MSR, positioned so that the magnetic stripe can be read by the head of the MSR. As in the swipe-type MSR, the head is enclosed and cannot be opened by the merchant. The movement of the card, either in the swipe or insert type MSR may additionally be motorized.

As cards are repeatedly swiped through the card swipe track to close out sales or for other transactions, the card swipe track—and, more importantly, the reader head inside the card swipe track—becomes dirty. In order to maintain MSR's at top performance levels (i.e., to avoid reader failures and machine malfunctions), they must be cleaned regularly, with the frequency of cleaning generally proportional to the frequency of usage of the MSR. Unfortunately, due to the narrowness of the space in the card swipe track that must be cleaned, this currently necessitates the purchase of disposable magstripe cleaning cards, increasing the cost to the merchant. There are currently several different kinds of disposable magstripe reader cleaning cards available on the market. These cleaning cards are the same size and shape as a credit card and typically come pre-saturated and individually packaged. They clean the reader head and card swipe track, as well as any frequent contact points, removing dirt and oil buildup and any other contamination deposits in the machines. Most of these cleaning cards may be used in all types of machines including swipe, insert, and motorized readers.

However, there are several problems with these cleaning cards that result in higher costs for merchants. First, these cleaning cards are limited to one-time use only. For example, such currently available cleaning cards such as the Happ Mag Stripe Reader Cleaning Card and KIC Cleaning Card must be disposed of after one use. Having to purchase these cleaning cards routinely can be costly for merchants. Larger businesses that operate numerous locations and that contain hundreds or thousands of POS terminals experience very high costs for these disposable cleaning cards. Additionally, if the MSR head and card swipe track are very dirty, more than one disposable card may need to be required to clean a single card swipe track, increasing expenses.

Second, the cleaning cards often do not fully clean the reader head and, therefore, fail to prevent the types of machine malfunctions for which they are intended. The reason for this failure is due to the nature of the head itself. As a user slides a card through one type of MSR's card swipe track, the card will trigger the reader head which is on a small spring system. The reader head then moves with the card as it is swiped in order to read accurately the information on that card's magnetic stripe. When a merchant slides a cleaning card through the card swipe track, the reader head reacts the same way—it moves with the cleaning card. The movement of the reader head as the cleaning card passes over it ensures that the head will not be fully cleaned (for better removal of the dirt, grease or grime that builds up on the head, the head would need to remain in place so that some friction or abrasion would occur). The failure of the cleaning card to completely clean the head ultimately results in additional costs to merchants and other users of MSR's in the form of service costs. Typically, when the service worker is called to "repair" an MSR that is not working properly, the "repair" is nothing more than a full cleaning of the head. The service worker is able to open the card swipe track on the MSR, which give him full access to the head. The worker then simply cleans the head in a complete manner—something that the cleaning card is unable to do.

It would be advantageous to provide a device that protected the MSR head from dust, dirt, grease or any other substance likely to impede the reader's functioning, but could be easily removed and cleaned by the merchant. It would also be advantageous if this removable MSR head protection device could be utilized in both new MSR designs and in existing magnetic stripe readers, as well as with swipe-type MSR's, insert-type MSR's, manual swipe MSR's, and motorized swipe MSR's. Thus the merchant would not have to purchase disposable cleaning cards. Additionally, merchants would avoid the costs of having to call service workers to clean/repair MSR's that are not working properly due to the failure of the cleaning cards. Furthermore, with a device that could be used with existing MSR models, merchants could maximize cost savings, for example by avoiding having to purchase or rent new equipment plus by reducing cleaning card and service costs on their existing systems.

Accordingly, there is an established need for an efficient reader head protection device that is readily insertable and removable and cleanable, that provides shielding and protection to the reader head, that is usable with a variety of currently existing and future designs of MSR's, and that reduces expenditures for MSR cleaning cards and for MSR service costs.

SUMMARY OF THE INVENTION

The present invention is directed to a practical, money-saving insertable and removable reader head protection device for a magnetic stripe reader that is capable of protecting the reader head from dirt, oil, and the like, thus improving the accuracy of reading the information contained on the stripe recording medium provided on a magnetic stripe card, and is also capable of being removed for manual cleaning to keep the magnetic stripe reader (MSR) in peak operating condition.

The insertable and removable reader head protection device for a magnetic stripe reader provided includes a thin, non-ferromagnetic insertable generally vertical insert panel disposed between the reader head and the magnetic stripe card, as the magnetic stripe card is inserted and swiped through a card swipe track in the MSR.

The reader head protection device provided can be used with MSR's of a wide variety of different types and designs, including being usable as an add-on accessory for use with existing types of magnetic stripe readers and usable in the initial design and manufacture of new magnetic stripe readers.

When using the magnetic stripe reader head protection device the magnetic stripe reader owner will reduce downtime due to non-operational readers and reduce the cost of cleaning cards and service costs, as the insertable and removable magnetic stripe reader head protection device can easily be removed for cleaning with a generic household cleaning product.

An object of the present invention is to provide an insertable and removable reader head protection device for a magnetic stripe reader that is configured to protect the reader head from dirt, oil, grime, and the like.

A further object of the present invention is to provide an insertable and removable reader head protection device for a magnetic stripe reader that is configured for easy and convenient removal of the reader head protection device from the magnetic stripe reader.

An additional object of the present invention is to provide an insertable and removable reader head protection device for a magnetic stripe reader that is configured for easy and convenient cleaning of the reader head protection device once removed from the magnetic stripe reader.

Another object of the present invention is to provide an insertable and removable reader head protection device for a magnetic stripe reader that can be adapted for use with a wide variety of types of existing magnetic stripe readers.

An additional object of the present invention is to provide an insertable and removable reader head protection device for a magnetic stripe reader that reduces the costs to the merchant for currently available disposable reader head cleaning cards and for MSR service calls.

These and other objects, features, and advantages of the present invention will become more readily apparent from the attached drawings and from the detailed description of the preferred embodiments, which follow.

BRIEF DESCRIPTION OF THE DRAWINGS

The preferred embodiments of the invention will hereinafter be described in conjunction with the appended drawings, provided to illustrate and not to limit the invention, where like designations denote like elements, and in which:

FIG. 9 is a perspective view focusing on the detail of the integrated MSR, showing the fourth embodiment of the insertable and removable reader head protection device for a magnetic stripe reader of the present invention in application as an add-on accessory for an existing integrated MSR.

Like reference numerals refer to like parts throughout the several views of the drawings.

DETAILED DESCRIPTION OF THE PREFERRED EMBODIMENTS

Shown throughout the figures, the present invention is directed toward a convenient insertable and removable reader head protection device for a magnetic stripe reader that is capable of protecting the reader head from dirt, oil, and the like, thereby improving the accuracy of reading the information contained on the stripe recording medium provided on a magnetic stripe card, and is also capable of being removed for manual cleaning to keep the magnetic stripe reader (MSR) in optimum operating condition. The removable reader head protection device provided includes a thin, generally vertical, non-ferromagnetic insertable panel disposed between the reader head and the magnetic stripe card, as the magnetic stripe card is inserted and swiped through a card swipe track in the MSR.

The insertable and removable reader head protection device includes a first embodiment illustrating a reader head protection device suitable for incorporation into a newly manufactured MSR, a second embodiment illustrating an alternate design of a reader head protection device to be incorporated into a newly manufactured MSR, a third embodiment illustrating a reader head protection device embodied as an add-on accessory that can be utilized with existing types of external MSR's, and a fourth embodiment illustrating a reader head protection device embodied as an add-on accessory that can be utilized with existing types of MSR's that are integrated into point of sale terminals.

The removable magnetic stripe reader head protection device provided can be used with MSR's of a wide variety of types, such as, for example, the following MSR's: external, integrated, manual swipe, mechanized swipe, vertical swipe, horizontal swipe, in and out swipe, gliding reader head, stationary reader head, open card swipe track, and partially closed card swipe track.

Figure 1:
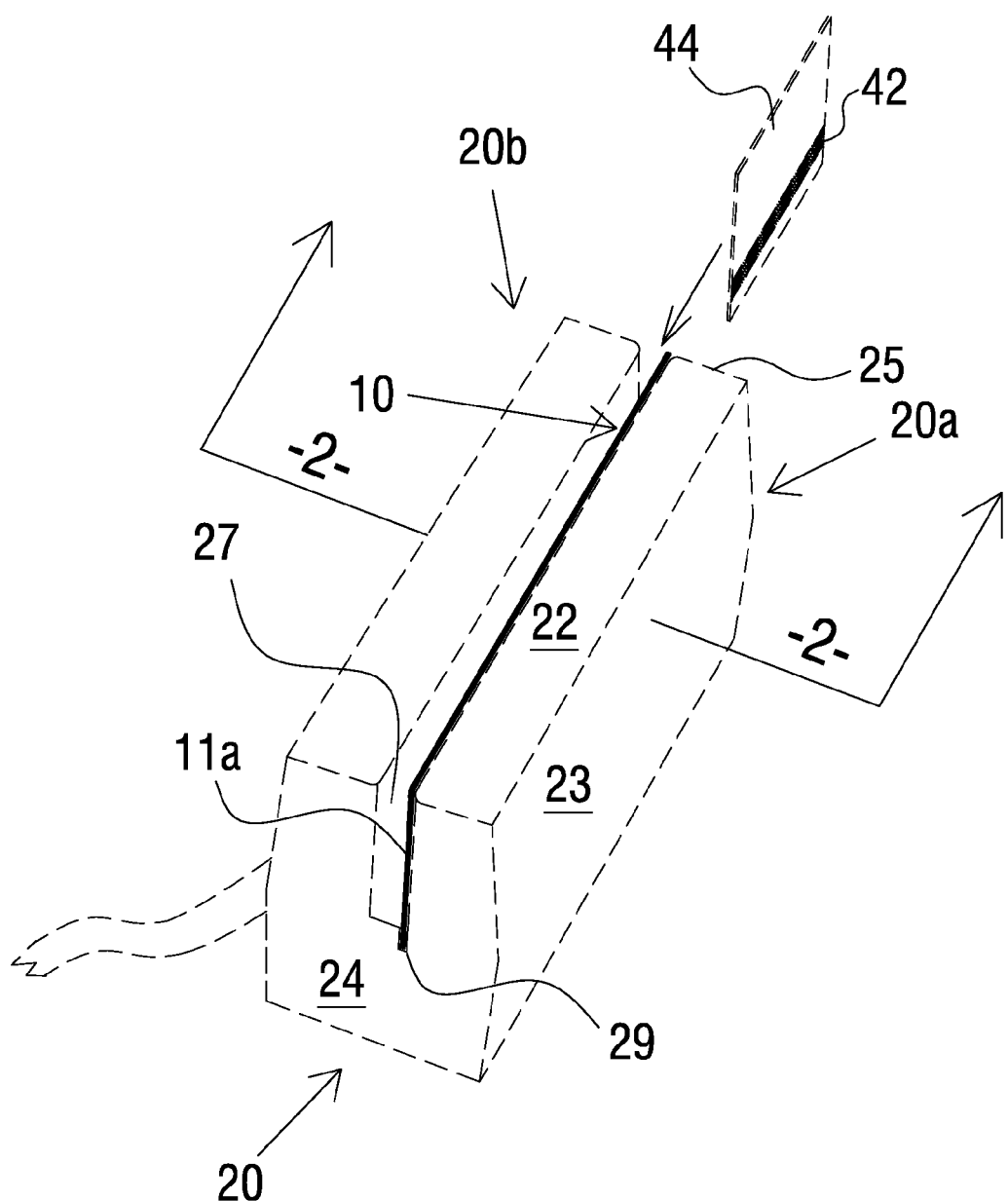
FIG. 1 is a perspective view showing a first preferred embodiment of the insertable and removable reader head protection device for a magnetic stripe reader of the present invention as applied to an external MSR.
Figure 2:
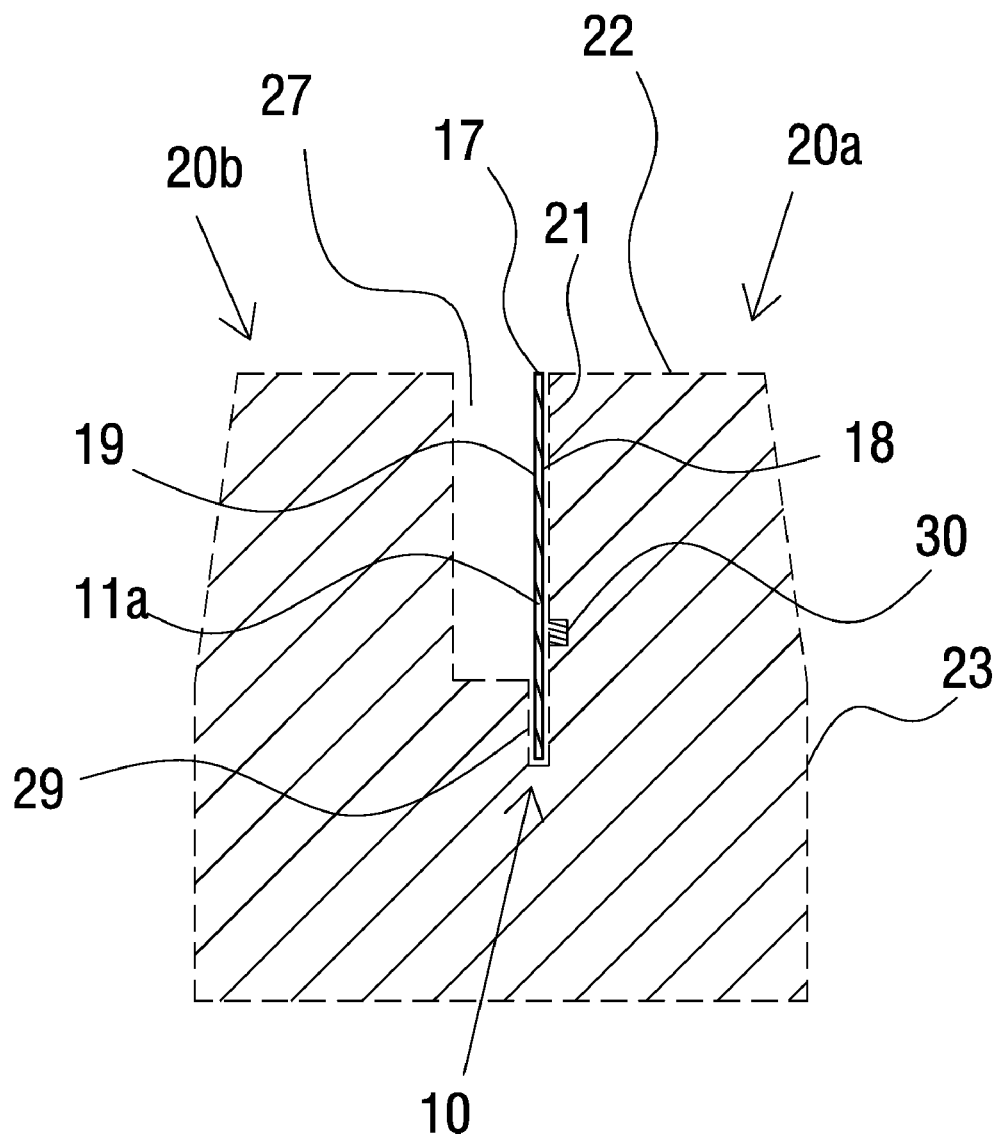
FIG. 2 is a cross-sectional view taken along lines -2-2- of FIG. 1, showing the first preferred embodiment of the insertable and removable reader head protection device for a magnetic stripe reader of the present invention as applied to an external MSR.
Figure 3:
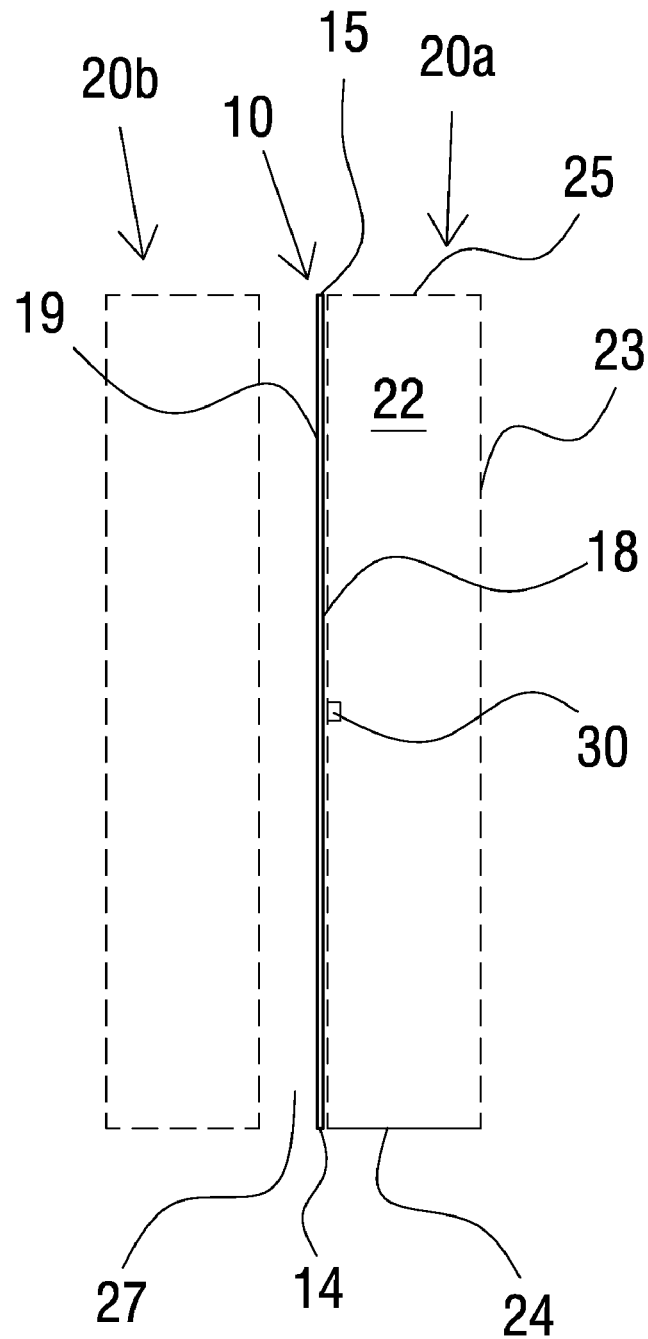
FIG. 3 is a top view showing the first preferred embodiment of the insertable and removable reader head protection device for a magnetic stripe reader of the present invention as applied to an external MSR.

Referring now to FIG. 1 to FIG. 3, an insertable and removable reader head protection device for a magnetic stripe reader, shown generally as reference number 10, is illustrated in accordance with a first preferred embodiment of the present invention showing a reader head protection device incorporated into a newly manufactured MSR 20, with the MSR generally divided into two longitudinal sections (a first longitudinal section 20a and a second longitudinal section 20b) by a card swipe slot or track 27 into which a magnetic stripe card 44 is inserted and swiped to conduct a transaction. The reader head 30 (FIG. 2, FIG. 3) for reading the information contained on the magstripe 42 on a magnetic stripe card 44 is located in a generally central area of the first longitudinal section 20a.

As shown, the insertable and removable reader head protection device 10 includes a thin, flat, substantially flat protective vertical insert panel 11a of a non-ferromagnetic material. The insert panel 11a comprises an inner surface 18 (FIG. 2), an outer surface 19 (FIG. 2), a first end 14 (FIG. 3), a second end 15 (FIG. 3), and an upper edge 17 (FIG. 2). The vertical insert panel 11a is disposed between the reader head 30 and the magnetic stripe card 44, as it is swiped in the card swipe track 27. Specifically, the inner surface 18 of the insert panel 11a is positioned adjacent to wall 21 of first longitudinal section 20a with the outer surface 19 facing outward toward the card swipe track 27. Thus the insert panel 11a is located in a position to protect and shield the reader head 30 from dirt, dust, oil, or other contaminants that might soil the reader head 30 or might serve to obscure the information contained on magstripe 42 of magnetic stripe card 44. When the insertable and removable reader head protection device 10 is being utilized the insert panel 11a is held in this dirt-shielding position by any suitable mechanical holding means. One such holding means is illustrated as a channel 29 formed at the base of first longitudinal section 20a of the MSR 20. Channel 29 is configured to secure the reader head protection device 10 when in use, and configured to allow the user to manually remove the reader head protection device when cleaning is desired by sliding the insert panel 11a toward one end of channel 29.

Any non-ferromagnetic material may be used for insert panel 11a, such as, for example, a polymer, a paper, or a non-ferromagnetic sheet metal.

Figure 4:
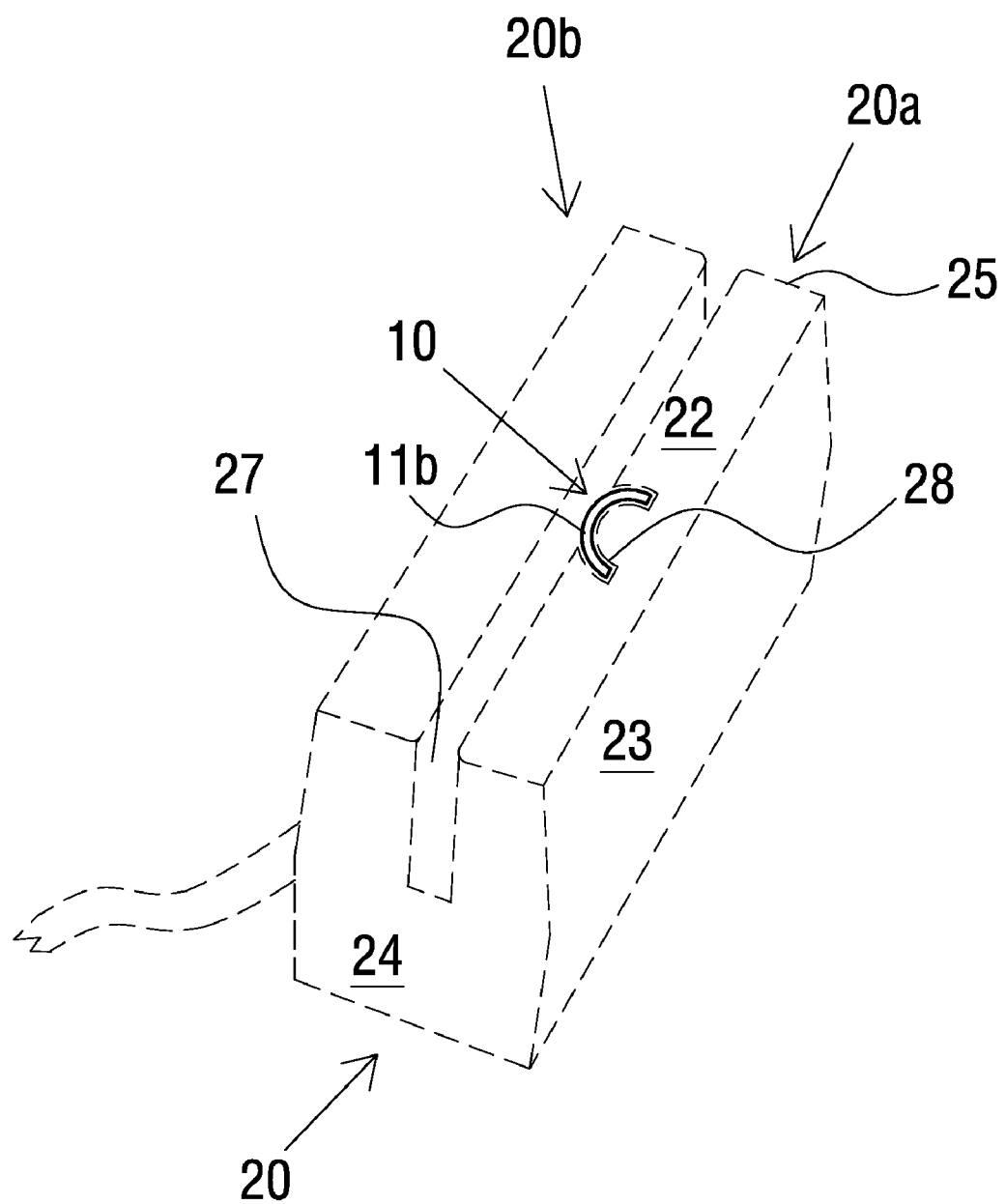
FIG. 4 is a perspective view showing the second embodiment of the insertable and removable reader head protection device for a magnetic stripe reader of the present invention as applied to an external MSR.

FIG. 4 illustrates a second exemplary embodiment of the insertable and removable reader head protection device of the present invention, generally referred to by the reference numeral 10. The second exemplary embodiment of the reader head protection device 10 functions in a similar manner to the first exemplary embodiment of FIG. 1 to FIG. 3. The reader head protection device 10 of the second embodiment provides a second design that can be incorporated into a newly manufactured MSR 20.

As shown, the second embodiment of the reader head protection device 10 includes a protective, thin, generally semi-circular vertical insert panel 11b of a non-ferromagnetic material, as opposed to the flat vertical insert panel 11a of the first embodiment. As in the first embodiment, the semi-circular vertical insert panel 11b is disposed between the reader head 30 and the magnetic stripe card 44, as it is swiped in the card swipe track 27.

When the insertable and removable reader head protection device 10 is being utilized the semi-circular vertical insert panel 11b is held in its dirt-shielding position by any suitable mechanical holding means. One such holding means is illustrated as a channel 28 formed as a generally semi-circular vertically-extending channel within first longitudinal section 20a of the MSR 20, being complementary to the shape of semi-circular vertical insert panel 11b. Channel 28 is configured to secure the reader head protection device 10 when in use, and configured to allow the user to manually remove the reader head protection device when cleaning is desired by sliding the semi-circular vertical insert panel 11b upward and out the top of channel 28. Preferably semi-circular vertical insert panel 11b will extend slightly above the level of the top surface 22 of first longitudinal section 20a, for ease of grasping for removal for cleaning.

While two embodiments of the insertable and removable reader head protection device 10 for incorporating into two specific new designs of MSR's, other variations for other types of MSR's are within the scope of the invention. For example, either the flat insert panel of the first embodiment or the semi-circular insert panel of the second embodiment could be used in a MSR in which the card 44 is inserted totally into a slot in the MSR and then mechanically ejected after the transaction is completed, as opposed to the more typical manual swipe action type MSR.

Figure 5:
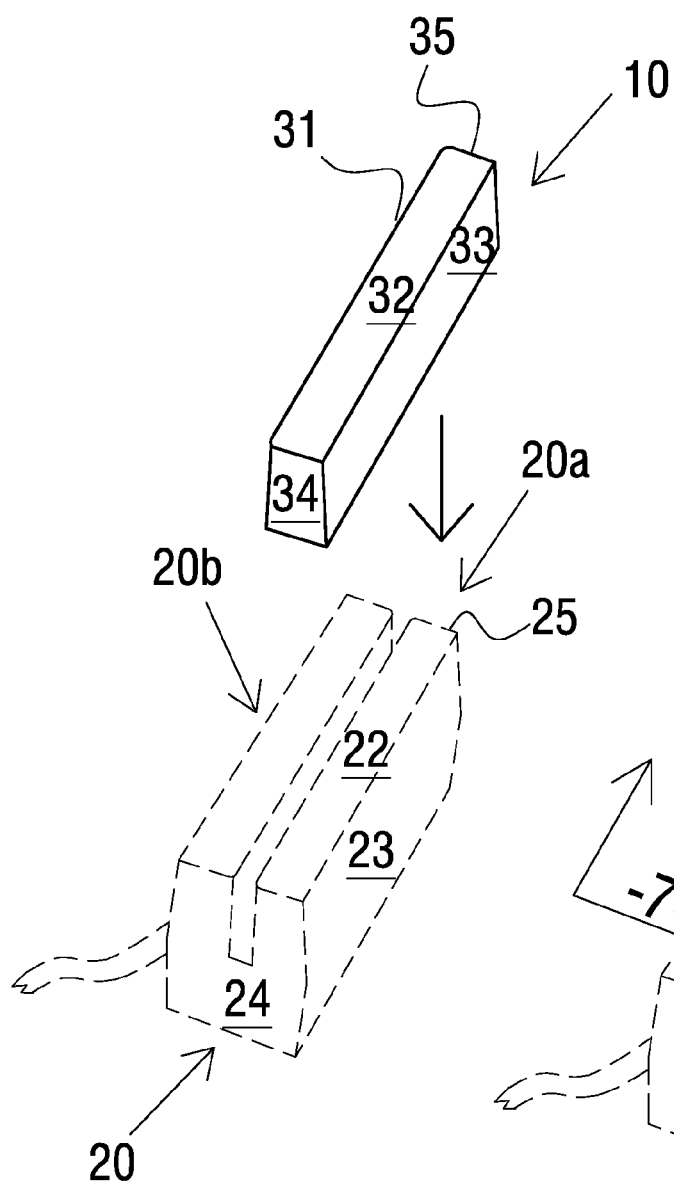
FIG. 5 is a perspective view showing the third embodiment of the insertable and removable reader head protection device for a magnetic stripe reader of the present invention for utilizing as an add-on accessory for an existing external MSR.
Figure 6:
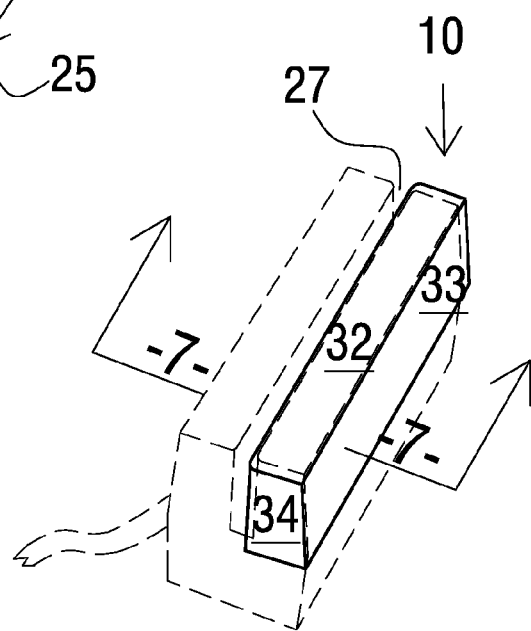
FIG. 6 is a perspective view showing the third embodiment of the insertable and removable reader head protection device for a magnetic stripe reader of the present invention in application as an add-on accessory for an existing external MSR.
Figure 7:
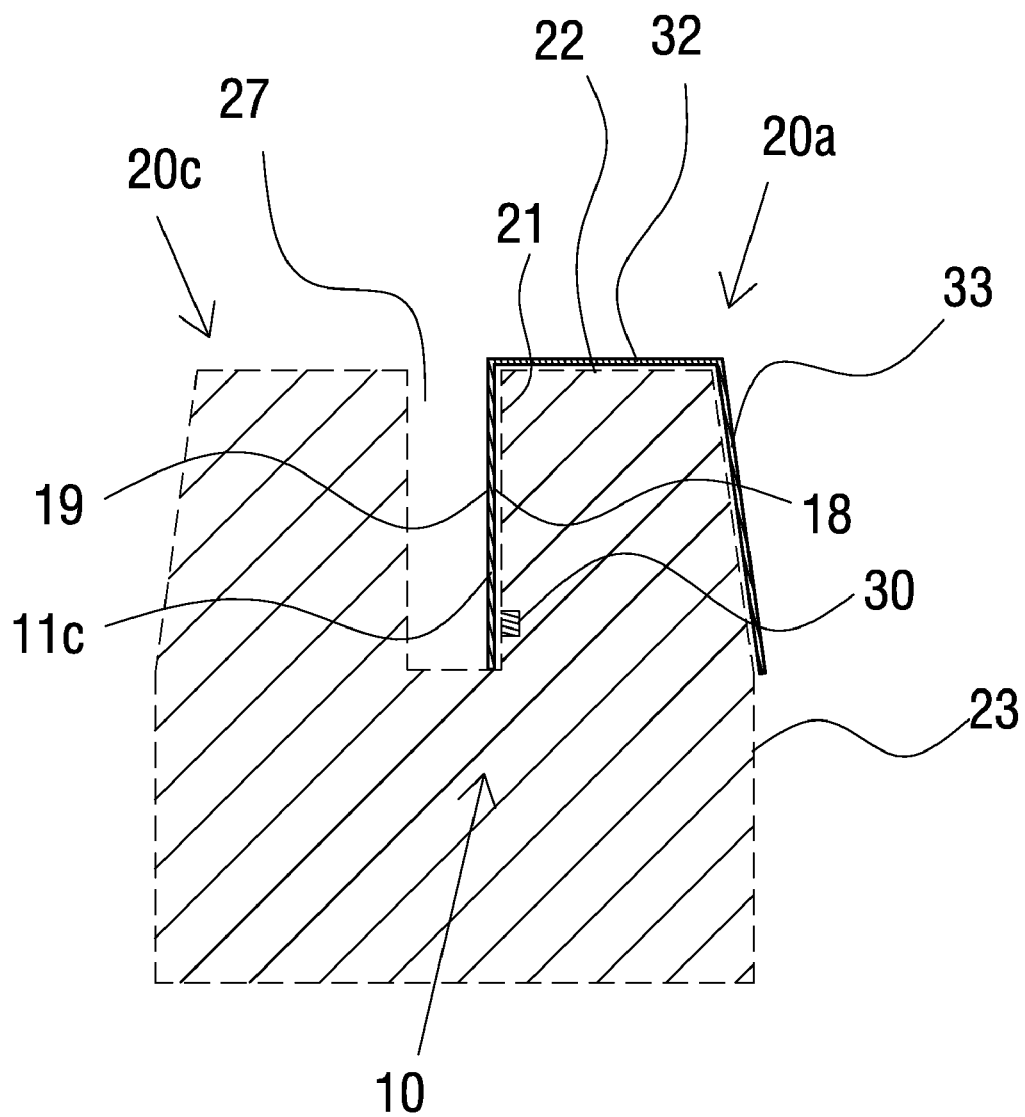
FIG. 7 is a cross-sectional view taken along lines -7-7- of FIG. 6, showing the third embodiment of the insertable and removable reader head protection device for a magnetic stripe reader of the present invention in application as an add-on accessory for an existing external MSR.

FIG. 5, FIG. 6, and FIG. 7 illustrate a third exemplary embodiment of the insertable and removable reader head protection device of the present invention, generally referred to by the reference numeral 10. The third exemplary embodiment of the reader head protection device 10 functions in a similar manner to the first exemplary embodiment of FIG. 1 to FIG. 3, but illustrates the use of the reader head protection device embodied as an add-on accessory that can be utilized with existing types of external MSR's 20, advantageously allowing the owner of an existing MSR to inexpensively retrofit his or her current MSR.

As shown, the third embodiment of the reader head protection device 10 includes a protective, thin, generally flat vertical insert panel 11c (FIG. 7) of a non-ferromagnetic material. As in the first embodiment, the flat vertical insert panel 11c is disposed between the reader head 30 and the magnetic stripe card 44, as it is swiped in the card swipe track 27. The flat vertical insert panel 11c is adapted to fit in the card swipe track 27 with its inner surface positioned alongside the outward facing wall 21 of first longitudinal section 20a to protect the reader head 30. A first end of the flat vertical insert panel 11c extends generally to the first end of the card swipe track 27 and a second opposite end of the flat vertical insert panel 11c extends generally to the opposite second end of the card swipe track 27. The flat vertical insert panel 11c is adapted to be manually insertable into the card swipe track 27, where it remains in that dirt-shielding position when a magnetic stripe card 44 is swiped along the outer surface 19 of the flat vertical insert panel 11c, and, further, the flat vertical insert panel 11c is adapted to be manually removable from the card swipe track 27 for manual cleaning.

When the insertable and removable reader head protection device 10 is being utilized, the flat vertical insert panel 11c is preferably held in its dirt-shielding position by the addition of substantially flat, thin panels, as follows: a horizontal panel 32 adapted to be positioned over top 22 of the first longitudinal section 20a, a vertical side panel 33 adapted to be positioned over side 23 of the first longitudinal section 20a, a first vertical end panel 34 adapted to be positioned over first end panel 24 of the first longitudinal section 20a, and a second vertical end panel 35 adapted to be positioned over second end panel 25 of the first longitudinal section 20a, which together form a generally open box shape or cuboidal shape. The open cuboidal-shaped insertable and removable reader head protection device 10 formed is sized and configured to be manually placed over the top of the first longitudinal section 20a of the specific type of existing MSR for which it is designed. Preferably the panels 32, 33, 34, 35, and 11c are formed unitarily during manufacture, of a non-ferromagnetic material. Panels 32, 33, 34, and 35 may, alternatively, be composed of a material that varies from the non-ferromagnetic material of flat vertical insert panel 11c.

A first longitudinal edge of horizontal panel 32 is attached generally perpendicularly to the upper edge of the flat vertical insert panel 11c, with a first lateral edge of horizontal panel 32 attached generally perpendicularly to first vertical end panel 34, and a second lateral edge of horizontal panel 32 attached generally perpendicularly to second vertical end panel 35, and with a second longitudinal edge of horizontal panel 32 attached roughly perpendicularly to the upper edge of the vertical side panel 33, at an angle determined by the shape of the first longitudinal section 20a of said magnetic stripe reader 20. As the open cuboidal-shaped reader head protection device 10 is adaptable to fit over the top of the first longitudinal section 20a of any of a variety of particular types of existing MSR's, the particular angles of attachment will vary somewhat.

Thus the open cuboidal shape of the insertable and removable reader head protection device 10 serves to hold the flat vertical insert panel 11c in a dirt-shielding position between the reader head 30 and the magnetic stripe card 44 as it is swiped.

Figure 8:
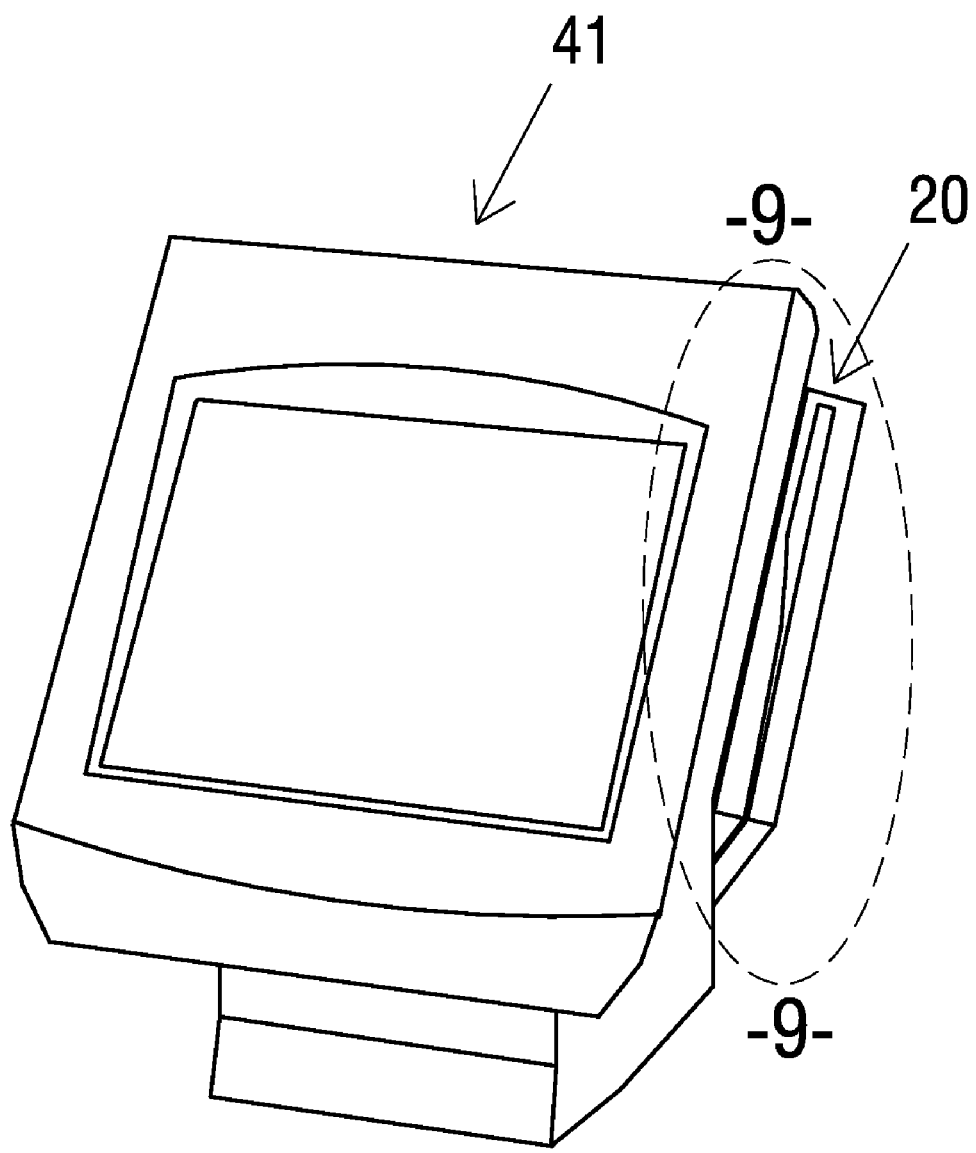
FIG. 8 is a perspective view showing a magnetic stripe reader (MSR) integrated into a point of sale (POS) terminal of the prior art.

FIG. 9 illustrates a fourth exemplary embodiment of the insertable and removable reader head protection device of the present invention, generally referred to by the reference numeral 10. The fourth exemplary embodiment of the reader head protection device 10 functions in a similar manner to the third exemplary embodiment of FIG. 5, FIG. 6, and FIG. 7, but illustrates the use of the reader head protection device embodied as an add-on accessory that can be utilized with MSR's 20 that are integrated into existing types of point of sale terminals. An existing type of point of sale terminal having an integrated MSR is illustrated in FIG. 8. Additionally, the fourth embodiment illustrates the use of the current invention with a partially closed card slide track 27, as opposed to the open card slide track 27 of the first three embodiments. Advantageously, the fourth embodiment allows the owner of an existing MSR integrated into a point of sale terminal to inexpensively retrofit his or her current MSR, instead of requiring the purchase of new equipment.

As shown, the fourth embodiment of the reader head protection device 10 includes a protective, thin, generally flat vertical insert panel 11d of a non-ferromagnetic material. As in the other embodiments, the flat vertical insert panel 11d is disposed between the reader head and the magnetic stripe card 44, as it is swiped in the card swipe track 27, the partially closed card swipe track of this embodiment having a closed upper end with a slightly larger opening to allow insertion of the card 44 and an open lower end.

The flat vertical insert panel 11d is adapted to fit in the card swipe track 27 with its inner surface positioned alongside the outward facing wall 21 of first longitudinal section 20a to protect the reader head 30. A first end of the flat vertical insert panel 11d extends generally to the first end of the outward facing wall 21 and a second opposite end of the flat vertical insert panel 11d extends generally to the opposite second end of the outward facing wall 21, forming the side of card swipe track 27. The flat vertical insert panel 11d is manually insertable into the card swipe track 27, where it remains in that dirt-shielding position when a magnetic stripe card 44 is swiped along the outer surface of the flat vertical insert panel 11d. Additionally, the flat vertical insert panel 11d is adapted to be manually removable from the card swipe track 27 for manual cleaning.

When the insertable and removable reader head protection device 10 is being utilized, the flat vertical insert panel 11d is held in its dirt-shielding position by the addition of a substantially flat, thin horizontal panel 32, and a vertical side panel 33. A first longitudinal edge of horizontal panel 32 is attached generally perpendicularly to the upper edge of the flat vertical insert panel 11d, with the second longitudinal edge of horizontal panel 32 attached roughly perpendicularly to the upper edge of the vertical side panel 33, at an angle determined by the shape of the first longitudinal section of said magnetic stripe reader.

To install the insertable and removable reader head protection device 10 of the fourth embodiment, it is slid from a position above the partially open card swipe track 27 downward to fit over the top 22 of first longitudinal section 20a with the flat vertical insert panel 11d protecting the reader head.

As the reader head protection device 10 is adaptable to fit over the top of the first longitudinal section 20a of any of a variety of particular types of existing MSR's, the particular angles of attachment will vary somewhat. The specific shape of the insertable and removable reader head protection device 10, therefore, varies somewhat, as it is sized and configured to fit over the top 22 of the first longitudinal section 20a of the specific type of existing MSR for which it is designed. Preferably the panels 32, 33, and 11d are formed unitarily during manufacture, of a non-ferromagnetic material, though panels 32 and 33 may, alternatively, be composed of a material that varies from the non-ferromagnetic material of flat vertical insert panel 11d.

Thus by utilizing any of the various embodiments of the insertable and removable reader head protection device 10, the MSR owner will reduce downtime due to non-operational readers and reduce the cost of cleaning cards and service costs required to clean MSR's, as the insertable and removable magnetic stripe reader head protection device keeps the reader head clean while being easily removable for cleaning with a generic household cleaning product.

From the foregoing, it will be apparent that the insertable and removable reader head protection device 10 of the current invention is configured to protect the reader head from dirt, oil, grime, and the like when installed, is configured for easy and convenient removal when cleaning is necessary, is configured for easy and convenient cleaning once removed, is adapted for use with a wide variety of types of existing magnetic stripe readers as well as new designs of magnetic stripe readers, is adapted for use with magnetic stripe readers in which either the reader head is held stationary within the MSR or in which the reader head glides with the card swipe action, is adapted for use with either the swipe-type or insert-type of MSR, is adapted for use with either a manual card swipe or a motorized card swipe, and is economically advantageous to use compared to currently available disposable reader head cleaning cards.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

I claim:

1. A removable protection device to protect a reader head of a magnetic stripe reader, where the magnetic stripe reader has a first longitudinal section and a second longitudinal section divided by a card swipe track for swiping magnetic stripe cards, with said reader head located in said first longitudinal section, comprising:

a substantially flat, thin vertical insert panel being a non-ferromagnetic material and having an inner surface, an outer surface, a first end, a second end, and an upper edge wherein said vertical insert panel is adapted to fit in said card swipe track with said inner surface positioned alongside said first longitudinal section to protect said reader head, having said first end extending generally to a first end of said card swipe track, and having said second end extending generally to a second end of said card swipe track, wherein said vertical insert panel is adapted to be manually insertable into said card swipe track, is adapted to remain in position when said magnetic stripe card is swiped along said outer surface of said vertical insert panel, and is adapted to be manually removable from said card swipe track for cleaning;

a substantially flat, thin horizontal panel having a first lateral edge, a second lateral edge, a first longitudinal edge, and a second longitudinal edge, wherein said first longitudinal edge of said horizontal panel is attached generally perpendicularly to said upper edge of said vertical insert panel, and wherein said horizontal panel is sized to fit over a top side of said first longitudinal section of said magnetic stripe reader; and a substantially flat, thin vertical side panel attached at an angle to said second longitudinal edge of said horizontal panel, with said angle determined by the shape of said first longitudinal section of said magnetic stripe reader, wherein said horizontal panel, said vertical side panel, and said vertical insert panel form a shape generally similar to the shape of said first longitudinal section of said magnetic stripe reader, and wherein said horizontal panel and said vertical side panel assist in securing said vertical insert panel in position in said card swipe track.

2. The removable protection device to protect a reader head of a magnetic stripe reader as recited in claim 1, wherein said vertical insert panel, said vertical side panel, and said horizontal panel are formed unitarily.

3. The removable protection device to protect a reader head of a magnetic stripe reader as recited in claim 2, wherein said non-ferromagnetic material is a polymer.

4. The removable protection device to protect a reader head of a magnetic stripe reader as recited in claim 2, wherein said non-ferromagnetic material is a paper.

5. The removable protection device to protect a reader head of a magnetic stripe reader as recited in claim 2, wherein said non-ferromagnetic material is a thin sheet metal.

6. The removable protection device to protect a reader head of a magnetic stripe reader as recited in claim 1, further comprising:

a substantially flat, thin first vertical end panel attached generally perpendicularly to said first lateral edge of said horizontal panel.

7. The removable protection device to protect a reader head of a magnetic stripe reader as recited in claim 6, further comprising:

a substantially flat, thin second vertical end panel attached generally perpendicularly to said second lateral edge of said horizontal panel, wherein said vertical insert panel, said vertical side panel, said first vertical end panel, said second vertical end panel, and said horizontal panel form a generally open cuboidal shape adapted to fit over said first longitudinal section of said magnetic stripe reader to assist in securing said vertical insert panel in position in said card swipe track.

8. The removable protection device to protect a reader head of a magnetic stripe reader as recited in claim 7, wherein said vertical insert panel, said vertical side panel, said first vertical end panel, said second vertical end panel, and said horizontal panel are formed unitarily.

9. The removable protection device to protect a reader head of a magnetic stripe reader as recited in claim 8, wherein said non-ferromagnetic material is a polymer.

10. The removable protection device to protect a reader head of a magnetic stripe reader as recited in claim 8, wherein said non-ferromagnetic material is a paper.

11. The removable protection device to protect a reader head of a magnetic stripe reader as recited in claim 8, wherein said non-ferromagnetic material is a thin sheet metal.

12. A removable protection device to protect a reader head of a magnetic stripe reader, where the magnetic stripe reader has a first longitudinal section and a second longitudinal section divided by a card swipe track for swiping a magnetic stripe card, with said reader head located in said first longitudinal section, comprising:

a generally thin protective vertical insert panel being a non-ferromagnetic material, said protective vertical insert panel having an inner surface, an outer surface, and a lower edge, wherein said protective vertical insert panel is disposed between said reader head and said card swipe track in a dirt-shielding position with said inner surface of said protective vertical insert panel adjacent to said reader head and with said outer surface of said protective vertical insert panel facing said magnetic stripe card when said magnetic stripe card is swiped, wherein said protective vertical insert panel is adapted to protect said reader head when in said dirt-shielding position, and wherein said protective vertical insert is adapted to be manually removable from said dirt-shielding position for manual cleaning; and an insert panel securing means to secure said protective vertical insert panel in said dirt-shielding position while allowing said protective vertical insert panel to be manually removable.

13. The removable protection device to protect a reader head of a magnetic stripe reader, as recited in claim 12, wherein said protective vertical insert panel is generally rectangular having a first end extending generally to a first end of said first longitudinal section and having a said second end extending generally to a second end of said first longitudinal section, and wherein said insert panel securing means comprises a generally straight channel disposed at the base of said first longitudinal section in said card swipe track and adapted to removably secure said lower edge of said protective vertical insert panel.

14. The removable protection device to protect a reader head of a magnetic stripe reader as recited in claim 13, wherein said non-ferromagnetic material is a polymer.

15. The removable protection device to protect a reader head of a magnetic stripe reader as recited in claim 13, wherein said non-ferromagnetic material is a paper.

16. The removable protection device to protect a reader head of a magnetic stripe reader as recited in claim 13, wherein said non-ferromagnetic material is a thin sheet metal.

17. The removable protection device to protect a reader head of a magnetic stripe reader, as recited in claim 12 wherein said protective vertical insert panel is semi-circular and wherein said insert panel securing means comprises a complementary semi-circular channel adapted to removably secure said lower edge of said protective vertical insert panel.

18. The removable protection device to protect a reader head of a magnetic stripe reader as recited in claim 17, wherein said non-ferromagnetic material is a polymer.

19. The removable protection device to protect a reader head of a magnetic stripe reader as recited in claim 17, wherein said non-ferromagnetic material is a paper.

20. The removable protection device to protect a reader head of a magnetic stripe reader as recited in claim 17, wherein said non-ferromagnetic material is a thin sheet metal.

\* \* \* \* \*